United States Patent
Mizawa et al.

(10) Patent No.: US 11,769,933 B2
(45) Date of Patent: Sep. 26, 2023

(54) NONAQUEOUS ELECTROLYTE SECONDARY BATTERY

(71) Applicant: SANYO Electric Co., Ltd., Daito (JP)

(72) Inventors: Atsushi Mizawa, Hyogo (JP); Junichi Sugaya, Osaka (JP); Tomomichi Ueda, Osaka (JP); Masahiro Nakamura, Osaka (JP); Kei Kobayashi, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 375 days.

(21) Appl. No.: 16/496,552

(22) PCT Filed: Mar. 20, 2018

(86) PCT No.: PCT/JP2018/010952
§ 371 (c)(1),
(2) Date: Sep. 23, 2019

(87) PCT Pub. No.: WO2018/180748
PCT Pub. Date: Oct. 4, 2018

(65) Prior Publication Data
US 2021/0111465 A1    Apr. 15, 2021

(30) Foreign Application Priority Data
Mar. 28, 2017 (JP) ................. 2017-062532

(51) Int. Cl.
*H01M 50/474* (2021.01)
*H01M 10/0525* (2010.01)
(Continued)

(52) U.S. Cl.
CPC ..... *H01M 50/474* (2021.01); *H01M 10/0525* (2013.01); *H01M 10/0587* (2013.01);
(Continued)

(58) Field of Classification Search
CPC .......... H01M 10/0587; H01M 50/536; H01M 50/474
See application file for complete search history.

(56) References Cited

U.S. PATENT DOCUMENTS

| 2011/0159344 A1 | 6/2011 | Kobayashi et al. |
| 2012/0214061 A1* | 8/2012 | Machida ........... H01M 10/0587 429/211 |

(Continued)

FOREIGN PATENT DOCUMENTS

| JP | 2005235414 | * | 9/2005 |
| JP | 2005235414 A | * | 9/2005 |

(Continued)

OTHER PUBLICATIONS

International Search Report dated Jun. 12, 2018, issued in counterpart Application No. PCT/JP2018/010952 (2 pages).

*Primary Examiner* — Ula C Ruddock
*Assistant Examiner* — Thomas H. Parsons
(74) *Attorney, Agent, or Firm* — WHDA, LLP

(57) ABSTRACT

The present disclosure aims to suppress, in a winding type electrode body in which a negative electrode lead is bonded to a winding start side end of a negative electrode collector, electrode plate deformation in association with charge/discharge cycles. A nonaqueous electrolyte secondary battery according to one aspect of the present disclosure includes a winding type electrode body (14). A negative electrode (12) includes a negative electrode lead (20a) bonded to a winding start side end of a negative electrode collector and is wound at least one turn from a winding-direction inner end so as not to face a positive electrode (11) with a separator (13) interposed therebetween. The negative electrode (12) includes an insulating tape (40) adhered to the (Continued)

negative electrode collector so as to straddle a surface of the negative electrode lead (20a) in a winding direction.

6 Claims, 6 Drawing Sheets

(51) Int. Cl.
*H01M 10/0587* (2010.01)
*H01M 50/595* (2021.01)
*H01M 50/536* (2021.01)
*H01M 50/586* (2021.01)
*H01M 50/534* (2021.01)

(52) U.S. Cl.
CPC ........ *H01M 50/595* (2021.01); *H01M 50/534* (2021.01); *H01M 50/536* (2021.01); *H01M 50/586* (2021.01)

(56) References Cited

U.S. PATENT DOCUMENTS

| | | | |
|---|---|---|---|
| 2018/0131034 A1 | | 5/2018 | Oura et al. |
| 2018/0351212 A1* | | 12/2018 | Matsui ................ H01M 10/425 |

FOREIGN PATENT DOCUMENTS

| | | | | |
|---|---|---|---|---|
| JP | 2007-273258 | A | | 10/2007 |
| JP | 2009-252384 | A | | 10/2009 |
| JP | 2010-073653 | A | | 4/2010 |
| JP | 2011-138632 | A | | 7/2011 |
| JP | 2013-012382 | A | | 1/2013 |
| JP | 2013-101755 | A | | 5/2013 |
| KR | 20220092314 | | * | 7/2022 |
| KR | 20220092314 | A | * | 7/2022 |
| WO | 2017/037981 | A1 | | 3/2017 |

* cited by examiner

NONAQUEOUS ELECTROLYTE SECONDARY BATTERY

TECHNICAL FIELD

The present disclosure relates to a nonaqueous electrolyte secondary battery.

BACKGROUND ART

PTL 1 has disclosed a battery in which in a cylindrical exterior package can made of iron or an iron alloy, an electrolyte liquid and a winding electrode body formed by winding a positive electrode and a negative electrode with at least one separator interposed therebetween are received. In this battery, two negative electrode leads are fitted to a winding start side end of the negative electrode located at an inner circumference side of the winding electrode body and to a winding finish side end of the negative electrode located at an outer circumference side thereof, and those negative electrode leads are connected to a bottom portion of the exterior package can.

CITATION LIST

Patent Literature

PTL 1: Japanese Published Unexamined Patent Application No. 2007-273258

SUMMARY OF INVENTION

Technical Problem

In the battery described in PTL 1, at an outer circumference side of the negative electrode lead disposed at the inner circumference side of the electrode body, the positive electrode and the negative electrode are wound at least two times. In the battery as described above, when a charge/discharge cycle is repeatedly performed, by an increase in pressure in the battery, the inner circumference side and the outer circumference side of the electrode body are pushed to each other, and as a result, stress concentration may occur in some cases at a portion which is overlapped with the negative electrode lead. Accordingly, electrode plate deformation may occur, that is, at least one of the positive electrode and the negative electrode may be locally deformed. In particular, since the pressure between the positive electrode and the negative electrode tends to be increased at a winding core side of the electrode body, when the negative electrode lead is fitted to the winding start side end of the negative electrode, the electrode plate deformation described above is liable to occur. The increase in electrode plate deformation is not preferable since internal short circuit may be generated thereby.

An object of the present disclosure is to provide a nonaqueous electrolyte secondary battery which can suppress, in a winding type electrode body in which a negative electrode lead is bonded to a winding start side end of a negative electrode collector, electrode plate deformation in association with charge/discharge cycles.

Solution to Problem

A nonaqueous electrolyte secondary battery according to the present disclosure comprises: a winding type electrode body in which a positive electrode and a negative electrode including a negative electrode active material layer formed on a surface of a belt-shaped negative electrode collector are wound in a spiral shape with at least one separator interposed therebetween, and the negative electrode includes a negative electrode lead bonded to a winding start side end of the negative electrode collector, is wound at least one turn from a winding-direction inner end so as not to face the positive electrode with the separator interposed therebetween, and includes an insulating tape adhered to the negative electrode collector so as to straddle a surface of the negative electrode lead in a winding direction.

Advantageous Effects of Invention

According to the nonaqueous electrolyte secondary battery of the present disclosure, the insulating tape is adhered to the negative electrode collector so as to straddle the surface of the negative electrode lead. Hence, in the winding type electrode body in which the negative electrode lead is bonded to the winding start side end of the negative electrode collector, the electrode plate deformation in association with the charge/discharge cycles can be suppressed.

DESCRIPTION OF EMBODIMENTS

Hereinafter, an embodiment according to the present invention will be described in detail with reference to the attached drawings. In the following description, particular shapes, materials, numeral values, directions, and the like are described by way of example to facilitate the understanding of the present invention, and those may be appropriately changed in accordance with the specification of a nonaqueous electrolyte secondary battery. In addition, the following term "approximately" is used to indicate, for example, besides "exactly the same", "substantially the same". Furthermore, in the following description, when embodiments and modified examples are included, the use of characteristic portions thereof in appropriate combination has been taken into consideration from the beginning.

Figure 1:
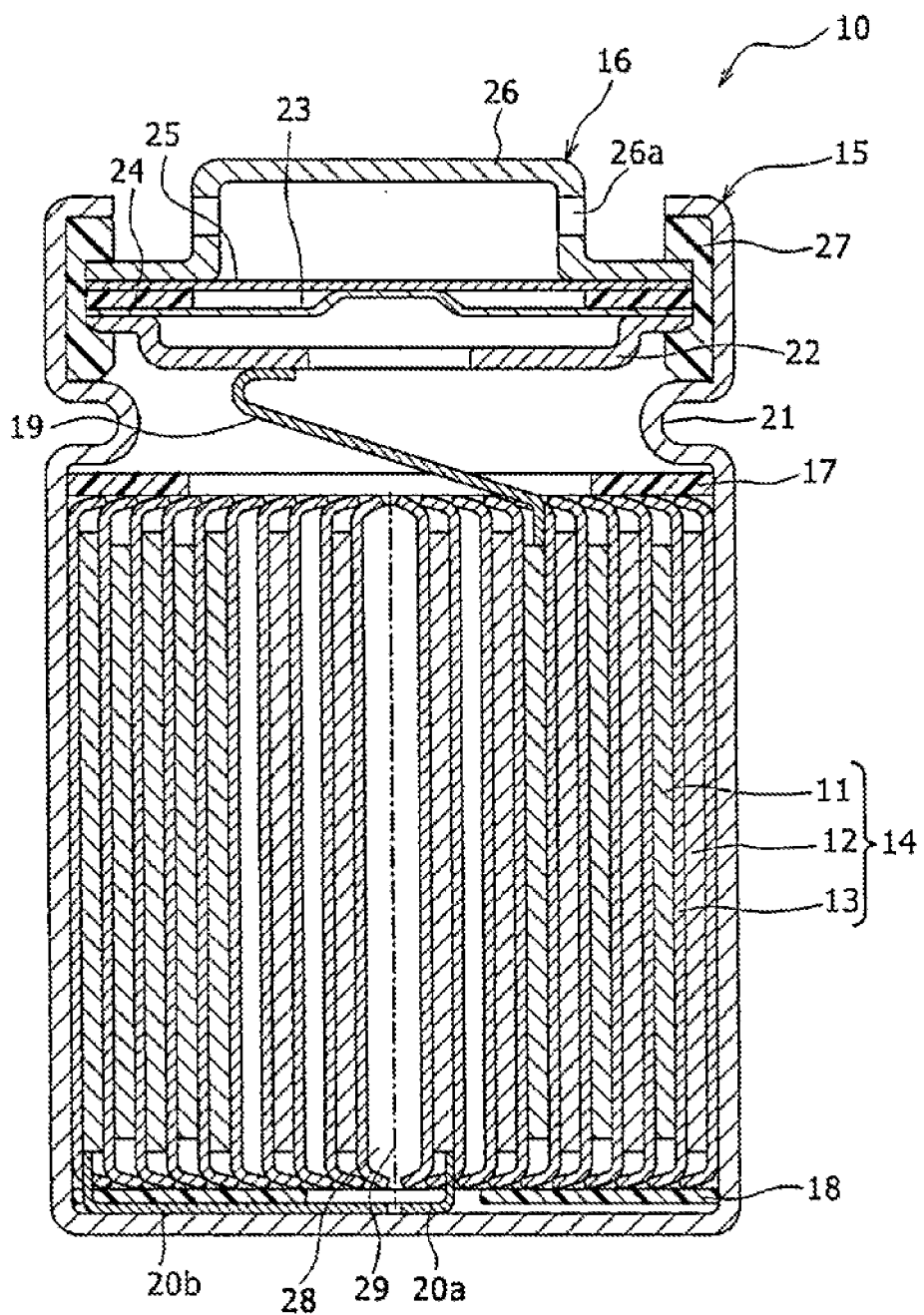
FIG. 1 is a cross-sectional view of a nonaqueous electrolyte secondary battery which is one example of an embodiment.
Figure 2:
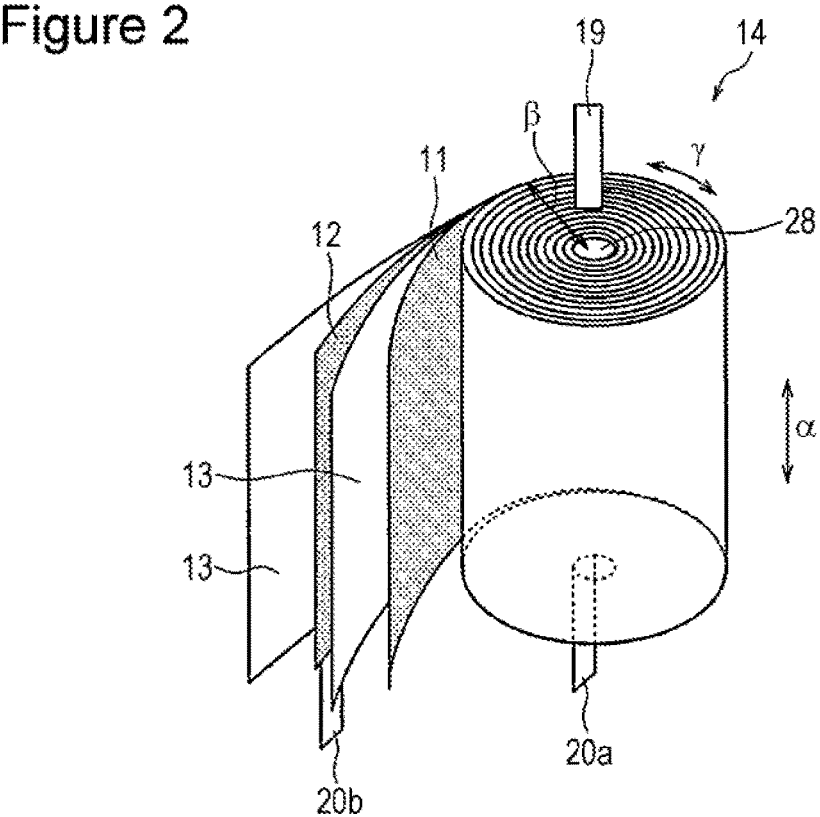
FIG. 2 is a perspective view of an electrode body forming the nonaqueous electrolyte secondary battery which is the example of the embodiment.

FIG. 1 is a cross-sectional view of a nonaqueous electrolyte secondary battery 10 of an embodiment. FIG. 2 is a perspective view of an electrode body 14 forming the nonaqueous electrolyte secondary battery 10. As shown in FIGS. 1 and 2 by way of example, the nonaqueous electrolyte secondary battery 10 includes the winding type electrode body 14 and a nonaqueous electrolyte (not shown). The winding type electrode body 14 includes a positive electrode 11, a negative electrode 12, and separators 13, and the positive electrode 11 and the negative electrode 12 are wound in a spiral shape with the separators 13 interposed therebetween. Hereinafter, one axial direction of the electrode body 14 and the other axial direction thereof may be called "up" and "down", respectively, in some cases. The nonaqueous electrolyte contains a nonaqueous solvent and an electrolyte salt dissolved in the nonaqueous solvent. The nonaqueous electrolyte is not limited to a liquid electrolyte and may be a solid electrolyte using a gel polymer or the like.

The positive electrode 11 includes a belt-shaped positive electrode collector 30 (see FIG. 3) and a positive electrode lead 19 bonded to the collector. The positive electrode lead 19 is an electrically conductive member to electrically connect the positive electrode collector 30 to a positive electrode terminal and is extended from an upper end of an electrode group to one side (upper side) of the electrode body 14 in an axial direction α. In this case, the electrode group indicates a portion of the electrode body 14 other than the individual leads. The positive electrode lead 19 is provided, for example, at an approximately central portion of the electrode body 14 in a radial direction β.

The negative electrode 12 includes a belt-shaped negative electrode collector 35 (see FIG. 3 which will be described later), two negative electrode leads 20a and 20b connected to the collector described above, and an insulating tape 40 (see FIG. 3 which will be described later). The negative electrode leads 20a and 20b are each an electrically conductive member which electrically connects the negative electrode collector 35 to a negative electrode terminal and are extended from a lower end of the electrode group to the other side (lower side) in the axial direction α. For example, of the two negative electrode leads 20a and 20b, one negative electrode lead 20a is provided at a winding start side end of the electrode body 14, and the other negative electrode lead 20b is provided at a winding finish side end thereof. An inner circumference side or a radius-direction inner side of the electrode body 14 is called a winding core side, and an outer circumference side or a radius-direction outer side may also be called a case side in some cases.

The positive electrode lead 19 and the negative electrode leads 20a and 20b are each a belt-shaped electrically conductive member having a thickness larger than that of the collector. The thickness of each lead is, for example, 3 to 30 times the thickness of the collector and is, in general, 50 to 500 μm. A material forming each lead is not particularly limited. The positive electrode lead 19 is preferably formed of a metal containing aluminum as a primary component, and the negative electrode leads 20a and 20b are each preferably formed of a metal containing nickel or copper as a primary component or a metal containing both nickel and copper. In addition, of the negative electrode leads 20a and 20b, the negative electrode lead 20b provided at the winding finish side end may be omitted in some cases.

At a winding start side end of the negative electrode collector 35, the insulating tape 40 is adhered to the negative electrode collector 35 so as to straddle a surface of the negative electrode lead 20a at the winding start side end in a winding direction. Accordingly, the electrode plate deformation of the electrode body 14 can be suppressed. The insulating tape 40 will be described later in detail.

In the example shown in FIG. 1, by a case main body 15 and a sealing body 16, a metal-made battery case which receives the electrode body 14 and the nonaqueous electrolyte is formed. On the top and the bottom of the electrode body 14, insulating plates 17 and 18 are provided, respectively. The positive electrode lead 19 is extended to a sealing body 16 side through a through-hole of the insulating plate 17 and is welded to a bottom surface of a filter 22 which is a bottom plate of the sealing body 16. In the nonaqueous electrolyte secondary battery 10, a cap 26 which is a top plate of the sealing body 16 electrically connected to the filter 22 is used as the positive electrode terminal. On the other hand, the negative electrode lead 20a passing through a through-hole of the insulating plate 18 and the negative electrode lead 20b passing along an outside of the insulating plate 18 are extended to a bottom portion side of the case main body 15 and are then welded to an inside surface of the bottom portion of the case main body 15. In the nonaqueous electrolyte secondary battery 10, the case main body 15 is used as the negative electrode terminal.

As described above, the electrode body 14 has a winding structure in which the positive electrode 11 and the negative electrode 12 are wound in a spiral shape with the separators 13 interposed therebetween. The positive electrode 11, the negative electrode 12, and the separators 13 are each formed to have a belt shape and are spirally wound so as to be alternately laminated to each other in the radial direction β of the electrode body 14. In the electrode body 14, the longitudinal direction of each electrode is a winding direction 1, and the width direction of each electrode is an axial direction α. In this embodiment, in a winding core portion including a winding core of the electrode body 14, a space 28 is formed. The electrode body 14 is wound in a spiral shape around a winding central axis 29 extending in the axis direction at the center of the space 28. In this case, the winding central axis 29 is a central axis extending in the axis direction at a central position of the space 28 in the diameter direction and is the winding core of the electrode body 14.

The case main body 15 is a metal-made bottom-closed cylindrical container. Between the case main body 15 and the sealing body 16, a gasket 27 is provided, so that the air-tightness in the battery case is secured. The case main body 15 has a protruding portion 21 which is formed, for example, by pressing a side surface portion from the outside and which supports the sealing body 16. The protruding portion 21 is preferably formed to have a ring shape along the circumference direction of the case main body 15, and the upper surface of the protruding portion 21 supports the sealing body 16.

The sealing body 16 includes the filter 22, a lower valve 23, an insulating member 24, an upper valve 25, and the cap 26, which are laminated sequentially from an electrode body 14 side. The individual members forming the sealing body 16 each have, for example, a circular shape or a ring shape and are electrically connected to each other except for the insulating member 24. The lower valve 23 and the upper valve 25 are connected to each other at central portions thereof, and between the peripheral portions thereof, the insulating member 24 is provided. When the inside pressure of the battery is increased by abnormal heat generation, for example, the lower valve 23 is fractured, and as a result, the upper valve 25 is swelled to a cap 26 side and is separated from the lower valve 23, so that the electrical connection between the above two valves is disconnected. When the inside pressure is further increased, the upper valve 25 is fractured, and gases are exhausted from an opening portion 26a of the cap 26.

Figure 3:
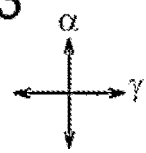
FIG. 3 is a front view showing a developed state of a positive electrode and a negative electrode which form the electrode body in the example of the embodiment.
Figure 3:
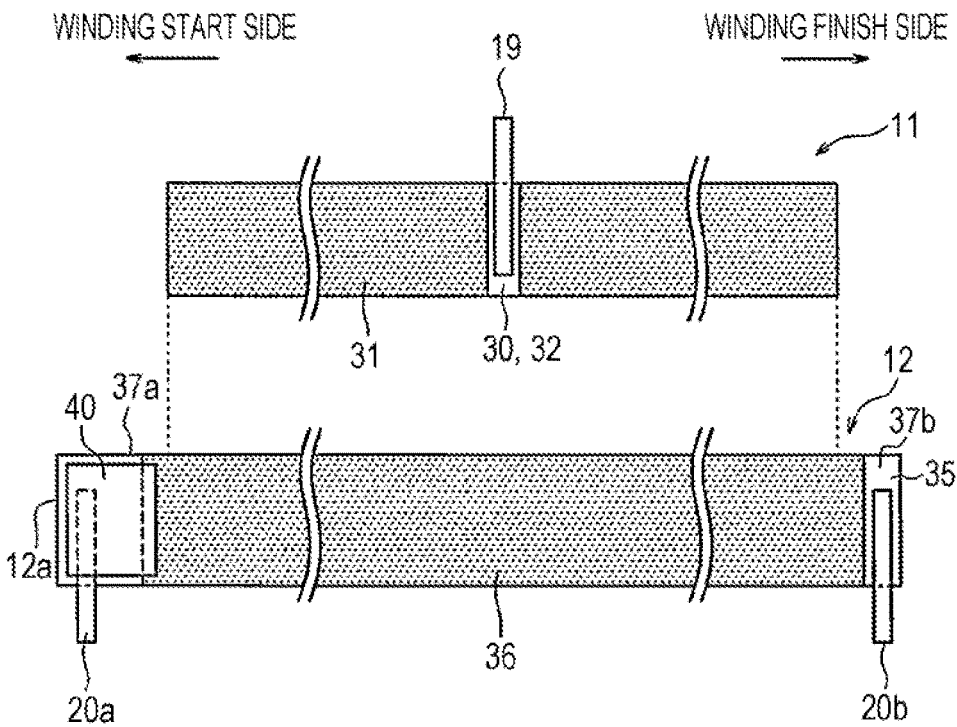
Figure 4:
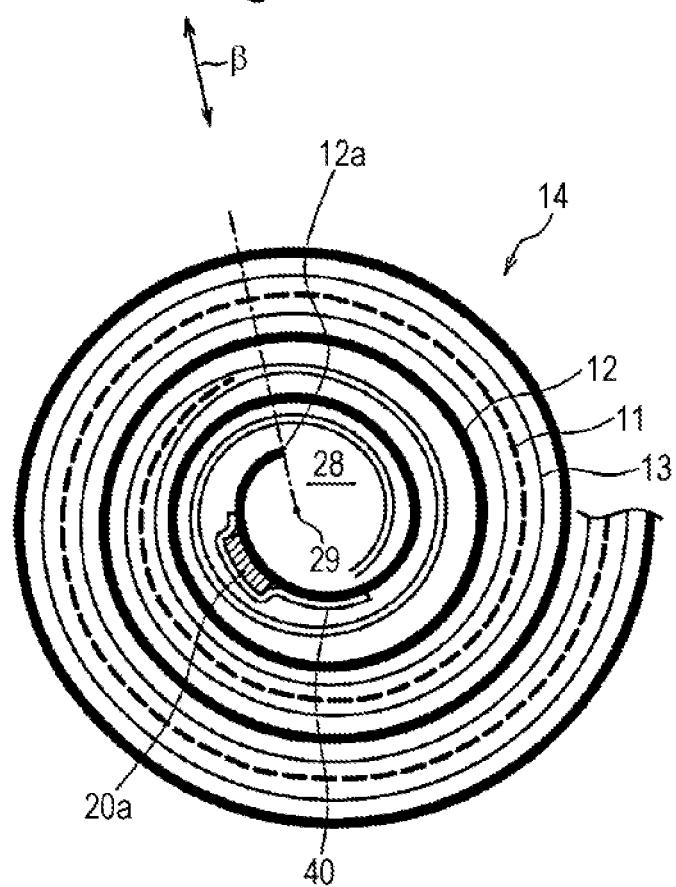
FIG. 4 is a cross-sectional view in the case in which the vicinity of a winding core of the electrode body is cut by a plane vertical to an axial direction thereof in the example of the embodiment.

Hereinafter, with reference to FIGS. 3 to 6, the electrode body 14 will be described in detail. FIG. 3 is a front view of the positive electrode 11 and the negative electrode 12 forming the electrode body 14. In FIG. 3, a developed state of each electrode is shown, and the left side and the right side of the plane indicate a winding start side and a winding finish side of the electrode body 14, respectively. FIG. 4 is a cross-sectional view in the case in which the vicinity of the winding core is cut by a plane vertical to the axial direction.

As shown in FIGS. 3 and 4 by way of example, in the electrode body 14, in order to prevent the precipitation of lithium on the negative electrode 12, the negative electrode 12 is formed larger than the positive electrode 11. In particular, the width of the negative electrode 12 in the axis direction α is larger than that of the positive electrode 11. In addition, the length of the negative electrode 12 in the longitudinal direction is larger than the length of the positive electrode 11 in the longitudinal direction. Accordingly, when winding is performed to form the electrode body 14, a portion at which a positive electrode active material layer 31 of the positive electrode 11 is formed is at least disposed to face a portion at which a negative electrode active material layer 36 of the negative electrode 12 is formed with the separator 13 interposed therebetween. In addition, in FIG. 4, the positive electrode active material layer 31 of the positive electrode 11 and the negative electrode active material layer 36 of the negative electrode 12 are not shown.

The positive electrode 11 includes the belt-shaped positive electrode collector 30 and the positive electrode active material layer 31 formed on the collector described above. In this embodiment, the positive electrode active material layers 31 are formed on two surfaces of the positive electrode collector 30. For the positive electrode collector 30, for example, foil of a metal, such as aluminum, or a film having a surface layer formed of the metal mentioned above may be used. A preferable positive electrode collector 30 is foil of a metal containing aluminum or an aluminum alloy as a primary component. The thickness of the positive electrode collector 30 is, for example, 10 to 30 μm.

The positive electrode active material layers 31 are preferably formed over the entire two surfaces of the positive electrode collector 30 except for an un-covered portion 32 which will be described later. The positive electrode active material layer 31 preferably contains a positive electrode active material, an electrically conductive agent, and a binder. The positive electrode 11 is formed by applying a positive electrode mixture slurry containing the positive electrode active material, the electrically conductive agent, the binder, and a solvent, such as N-methyl-2-pyrrolidone (NMP) on the two surfaces of the positive electrode collector 30, followed by drying and rolling.

As the positive electrode active material, for example, there may be mentioned a lithium transition metal oxide containing a transition metal element, such as Co, Mn, or Ni. Although the lithium transition metal oxide is not particularly limited, a composite oxide represented by a general formula of $Li_{1+x}MO_2$ (in the formula, $-0.2<x\leq0.2$, and M includes at least one of Ni, Co, Mn, and Al) is preferable.

As an example of the electrically conductive agent described above, for example, there may be mentioned a carbon material, such as carbon black (CB), acetylene black (AB), Ketjen black, or graphite. As an example of the binder described above, for example, there may be mentioned a fluorine-based resin, such as a polytetrafluoroethylene (PTFE) or a poly(vinylidene fluoride) (PVdF), a polyacrylonitrile (PAN), a polyimide (PI), an acryl-based resin, or a polyolefin-based resin. In addition, those resins mentioned above each may be used together with a carboxymethyl cellulose (CMC) or its salt, a polyethylene oxide (PEO), or the like. Those resins may be used alone, or at least two types thereof may be used in combination.

The positive electrode 11 has an un-covered portion 32 at which the surface of the metal forming the positive electrode collector 30 is exposed. The un-covered portion 32 is a portion to which the positive electrode lead 19 is connected and is a portion at which the surface of the positive electrode collector 30 is not covered with the positive electrode active material layer 31. The un-covered portion 32 is formed to have a width larger than that of the positive electrode lead 19. The un-covered portion 32 is preferably provided at two surfaces of the positive electrode 11 so as to be overlapped with each other in the thickness direction of the positive electrode 11. The positive electrode lead 19 is, for example, bonded to the un-covered portion 32 by ultrasonic wave welding.

In the example shown in FIG. 3, at a central portion of the positive electrode 11 in the longitudinal direction, the un-covered portion 32 is provided over the entire collector in the width direction. Although the un-covered portion 32 may be formed at an end portion side of the positive electrode 11 in the longitudinal direction, in view of electricity collection property, the un-covered portion 32 is preferably provided at a position at which the distance from one end of the positive electrode 11 in the longitudinal direction is approximately equivalent to the distance from the other end thereof. Since the positive electrode lead 19 is connected to the un-covered portion 32 provided at the position as described above, when the positive electrode 11 is wound to form the electrode body 14, the positive electrode lead 19 is disposed at the central position of the electrode body 14 in the radial direction so as to protrude to an upper side from the end surface of the electrode body 14 in the axial direction. The un-covered portion 32 is formed, for example, by intermittent coating in which the positive electrode mixture slurry is not applied to a part of the positive electrode collector 30. In addition, the un-covered portion 32 may be formed to have a length from the upper end of the positive electrode 11 to a point not reaching the lower end thereof.

The negative electrode 12 includes the belt-shaped negative electrode collector 35 and the negative electrode active material layer 36 formed on the negative electrode collector described above. In this embodiment, the negative electrode active material layers 36 are formed on two surfaces of the negative electrode collector 35. For the negative electrode collector 35, for example, foil of a metal, such as copper, or a film having a surface layer formed of the metal mentioned above is used. The thickness of the negative electrode collector 35 is, for example, 5 to 30 μm.

The negative electrode active material layers 36 are preferably formed on the entire two surfaces of the negative electrode collector 35 except for un-covered portions 37a and 37*b*. The negative electrode active material layer 36 preferably contains a negative electrode active material and a binder. The negative electrode 12 is formed by applying a negative electrode mixture slurry containing the negative electrode active material, the binder, water, and the like on the two surfaces of the negative electrode collector 35, followed by drying and rolling.

The negative electrode active material is not particularly limited as long as being capable of reversibly occluding and releasing lithium ions, and for example, there may be used a carbon material, such as natural graphite or artificial graphite, a metal, such as Si or Sn, forming an alloy with lithium, or an alloy or a composite oxide, each of which contains the material mentioned above. For the binder contained in the negative electrode active material layer 36, for example, a resin similar to that used in the case of the positive electrode 11 may be used. When the negative electrode mixture slurry is prepared using an aqueous solvent, for example, a styrene-butadiene rubber (SBR), a CMC or its salt, a polyacrylic acid or its salt, or a poly(vinyl alcohol) may be used. Those compounds may be used alone, or at least two types thereof may be used in combination.

The negative electrode 12 has un-covered portions 37*a* and 37*b* at each of which the surface of the metal forming the negative electrode collector 35 is exposed. The un-covered portions 37*a* and 37*b* are portions to which the negative electrode leads 20*a* and 20*b* are connected, respectively, and are portions at each of which the surface of the negative electrode collector 35 is not covered with the negative electrode active material layer 36. The un-covered portions 37*a* and 37*b* each have an approximately rectangular shape in plan view extending long in the width direction of the negative electrode 12 and are formed to have widths larger than those of the negative electrode leads 20*a* and 20*b*, respectively. The un-covered portions 37*a* are preferably formed at two surfaces of the negative electrode 12 so as to be overlapped with each other in the thickness direction of the negative electrode 12. The same configuration as described above may also be applied to the un-covered portion 37*b*.

In this embodiment, of the two negative electrode leads 20*a* and 20*b*, the winding start side negative electrode lead 20*a* is bonded to an outer circumference side surface of the negative electrode collector 35 by ultrasonic wave welding or the like. One end portion of the negative electrode lead 20*a* is disposed on the un-covered portion 37*a*, and the other end portion thereof is extended to a lower side from the lower end of the un-covered portion 37*a*.

In the example shown in FIG. 3, at the two ends (that is, the winding start side end and the winding finish side end) of the negative electrode 12 in the longitudinal direction, the un-covered portions 37*a* and 37*b* are respectively provided over the entire width length of the collector. The negative electrode lead 20*a* is provided on the un-covered portion 37*a* at the winding start side end of the negative electrode 12, and the negative electrode lead 20*b* is provided on the un-covered portion 37*b* at the winding finish side end of the negative electrode 12. As described above, sine the negative electrode leads 20*a* and 20*b* are provided at the two ends of the negative electrode 12 in the longitudinal direction, the electricity collection property is improved. A method to arrange the negative electrode leads is not limited to that described above, and the negative electrode lead 20*a* may only be provided at the winding start side end of the negative electrode 12. In this case, the un-covered portion 37*b* at the winding finish side end is preferably directly brought into contact with an inner circumference surface of the case main body 15. The un-covered portions 37*a* and 37*b* are each provided, for example, by intermittent coating in which the negative electrode mixture slurry is not applied to a part of the negative electrode collector 35.

For the separator 13, a porous sheet having an ion permeability and an insulating property is used. As a concrete example of the porous sheet, for example, a fine pore thin film, a woven cloth, or a non-woven cloth may be mentioned. As a material of the separator 13, an olefin resin, such as a polyethylene or a polypropylene, is preferable. The thickness of the separator 13 is, for example, 10 to 50 µm. In accordance with the increase in capacity and power of the battery, the thickness of the separator 13 tends to be decreased. The separator 13 has, for example, a melting point of approximately 130° C. to 180° C.

Figure 5:
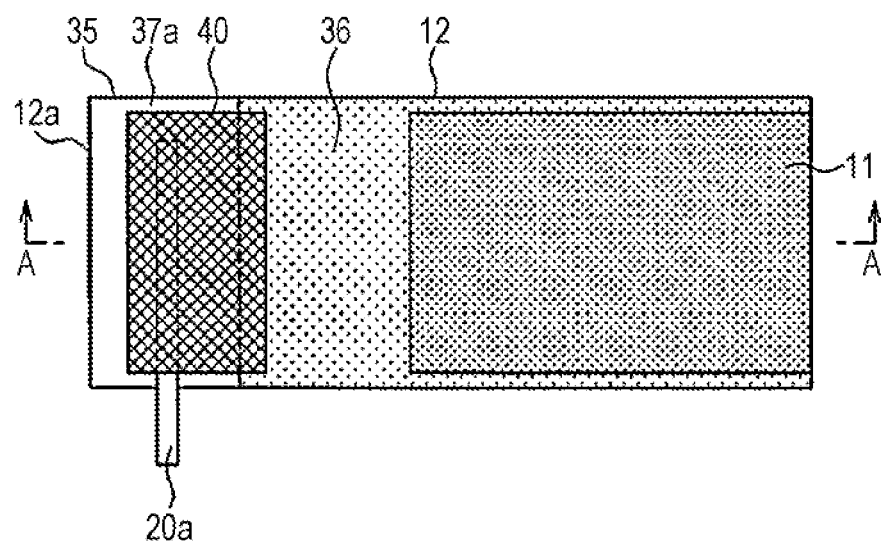
FIG. 5 is an enlarged view showing a developed state of a winding start side end of the negative electrode in the example of the embodiment.
Figure 6:
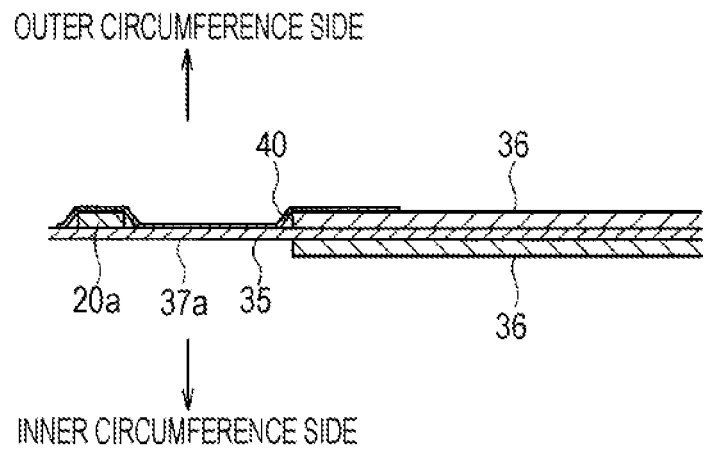
FIG. 6 is an A-A cross-sectional view of FIG. 5.

With reference to FIGS. 4 to 6, the insulating tape 40 will be described. FIG. 5 is an enlarged view showing a developed state of the winding start side end of the negative electrode 12. FIG. 6 is an A-A cross-sectional view of FIG. 5. As shown in FIGS. 4 to 6, the insulating tape 40 is adhered to the negative electrode collector 35 so as to straddle the surface of the negative electrode lead 20*a* at the winding start side end in the winding direction. In particular, the insulating tape 40 is adhered to the surface of the negative electrode lead 20*a* at an overlapping portion between the negative electrode lead 20*a* and the negative electrode collector 35 and to a portion of the outer circumference side surface of the negative electrode collector 35 adjacent to the overlapping portion.

As described above, the negative electrode lead 20*a* has a thickness larger than that of the negative electrode collector 35 and is provided in the vicinity of the winding core. Accordingly, by charge/discharge cycles repeatedly performed in the nonaqueous electrolyte secondary battery 10, since the electrode body 14 is expanded and contracted, the pressure in the battery is increased, and the inner circumference side and the outer circumference side of the electrode body 14 are pushed to each other. Hence, stress concentration may occur in some cases at a portion to be overlapped with the negative electrode lead 20*a* in the radial direction β. Hence, the electrode plate deformation in which at least one of the positive electrode 11 and the negative electrode 12 is locally deformed may occur in some cases. In particular, since the pressure between the positive electrode 11 and the negative electrode 12 tends to be increased at a winding core side, by the negative electrode lead 20*a* located at the winding start side end, the electrode plate deformation described above is liable to occur. The increase in electrode plate deformation is not preferable since internal short circuit may occur thereby in some cases.

In this embodiment, by the insulating tape 40 described above, the strength of a portion of the negative electrode collector 35 adjacent to the negative electrode lead 20*a* is increased. Furthermore, the insulating tape 40 is believed to suppress the electrode plate deformation by the following reasons. On the negative electrode collector 35, steps are formed because of end portions of the negative electrode lead 20*a* and the negative electrode active material layer 36. The steps as described above each may function as a starting point of local electrode plate deformation. By the insulating tape 40, slopes are provided at the end portions of the negative electrode lead 20*a* and the negative electrode active material layer 36. Hence, the electrode plate deformation generated from the step functioning as the starting point can be suppressed. Accordingly, as shown in FIGS. 5 and 6, the insulating tape 40 preferably covers not only the negative electrode lead 20a but also the winding start side end of the negative electrode active material layer 36.

The insulating tape 40 has, for example, a rectangular shape in plan view extending long along the longitudinal direction (width direction of the negative electrode collector 35) of the negative electrode lead 20a. Although the shape of the insulating tape 40 is not particularly limited, a shape corresponding to the shape of the negative electrode lead 20a is preferable.

In addition, the insulating tape 40 preferably covers a portion which includes a width-direction center of the negative electrode collector 35. When the battery is charged/discharged, the change in expansion and contraction of a width-direction central portion is increased as compared to that of each of the two ends in the width direction. Accordingly, the stress concentration of the electrode body 14 caused by the negative electrode lead 20a is liable to be increased at the width-direction central portion. When the insulating tape 40 covers the portion which includes the width-direction center of the negative electrode collector 35 as described above, the stress concentration described above can be more effectively reduced. Hence, the electrode plate deformation can be further suppressed.

Figure 7:
FIG. 7 is a cross-sectional view of an insulating tape in the example of the embodiment.

FIG. 7 is a cross-sectional view of the insulating tape 40. The insulating tape 40 is a two-layer tape formed of a base material layer 41 and an adhesive layer 42.

The thickness of the insulating tape 40 is, for example, 20 to 70 μm and is preferably 25 to 60 μm. The thickness of each layer of the insulating tape 40 can be measured by a cross-sectional observation using a scanning electron microscope (SEM). In addition, the thickness of the insulating tape 40 is preferably smaller than the thickness of the negative electrode lead 20a. By this preferable structure, since the insulating tape 40 is likely to be bent, the insulating tape 40 can be easily formed to have a desired shape which may reduce the stress concentration described above.

The base material layer 41 preferably contains no inorganic particles and is preferably formed substantially only from an organic material. The rate of the organic material in constituent materials of the base material layer 41 is, for example, 90 percent by weight or more, is preferably 95 percent by weight or more, or may be approximately 100 percent by weight. A primary component of the organic material is preferably a resin excellent in insulating properties, electrolyte liquid resistance, heat resistance, puncture strength, and the like. The thickness of the base material layer 41 is, for example, 10 to 45 μm and is preferably 15 to 35 μm. The thickness of the base material layer 41 is preferably larger than that of the adhesive layer 42.

The primary component of the base material layer 41 is, for example, preferably a resin, such as a polypropylene (PP). According to this preferable structure, since the insulating tape 40 can be made more flexible, the outside of the corner of the negative electrode lead 20a can be easily covered by the insulating tape 40 to have a curved shape, and the stress concentration described above is likely to be reduced. In addition, as the primary component of the base material layer 41, for example, an ester-based resin, such as a poly(ethylene terephthalate) (PET), a polyimide (PI), a polyphenylene sulfide (PPS), or a polyamide (PA) may also be used. Those resins may be used alone, or at least two types thereof may be used in combination.

The adhesive layer 42 is a layer to impart to the insulating tape 40, an adhesive property to the negative electrode lead 20a and the negative electrode collector 35. The adhesive layer 42 is formed by applying an adhesive on one surface of the base material layer 41. The adhesive layer 42 may be formed using an adhesive (resin) excellent in insulating properties, electrolyte liquid resistance, and the like. Although the adhesive forming the adhesive layer 42 may be a hot melt type which shows an adhesive property by heating or a thermosetting type which is cured by heating, in view of the productivity and the like, an adhesive having an adhesive property at room temperature is preferable. The adhesive layer 42 is formed, for example, of an acryl-based adhesive or a synthetic rubber-based adhesive. The thickness of the adhesive layer 42 is, for example, 5 to 30 μm.

In addition, the insulating tape 40 is not limited to the two-layer tape shown in FIG. 7 and may be a three-layer tape in which for example, between the base material layer and the adhesive layer, an inorganic particle-containing layer is formed. By the use of the three-layer tape as described above, the heat resistance of the insulating tape can be improved. The inorganic particle-containing layer preferably has a layer structure in which inorganic particles are dispersed in a resin matrix forming the layer. The inorganic particle-containing layer is formed, for example, by applying a resin solution containing inorganic particles on one surface of the base material layer 41. The thickness of the inorganic particle-containing layer is, for example, 0.5 to 10 μm and is preferably 1 to 5 μm.

The resin forming the inorganic particle-containing layer is preferably excellent in insulating properties, electrolyte liquid resistance, and the like and also preferably has a preferable adhesive property to the inorganic particles and the base material layer 41. As a preferable resin, an acryl-based resin, an urethane-based resin, or an elastomer thereof may be mentioned by way of example. Those resins may be used alone, or at least two types thereof may be used in combination.

The positive electrode 11, the negative electrode 12, and the separators 13, each has the structure as described above, are wound in a spiral shape, so that the electrode body 14 is formed. The outermost circumference of the electrode body 14 is formed by the separator 13, and a winding finish side end of the separator 13 is fixed by an insulating winding stop tape not shown.

As shown in FIG. 4, the space 28 having an approximately cylindrical shape is formed at the winding core portion of the electrode body 14 so as to extend in the axial direction. In addition, the negative electrode 12 is wound at least one turn from a winding-direction inner end 12a so as not to face the positive electrode 11 with the separator 13 interposed therebetween. Hence, even if the electrode plate deformation is generated at the winding start side end of the negative electrode 12, internal short circuit of the electrode body 14 is not likely to occur at an outer circumference side thereof.

Figure 8:
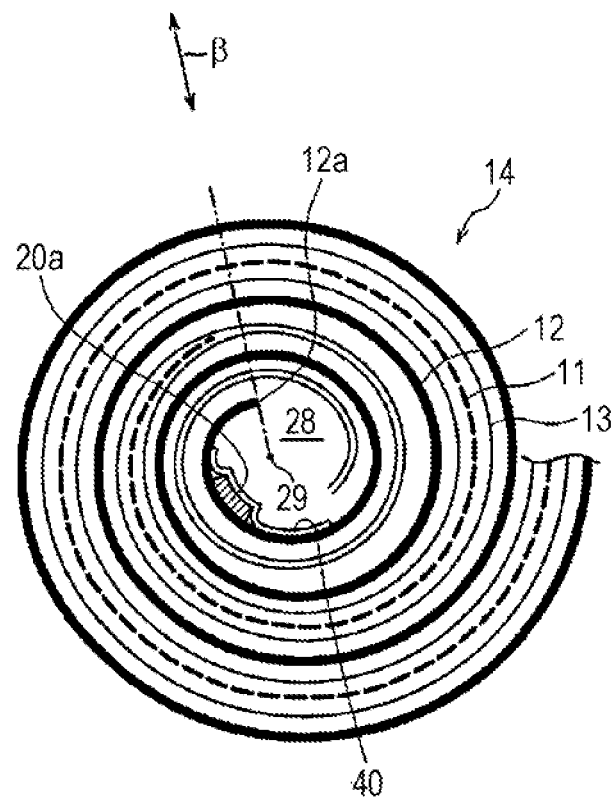
FIG. 8 is a cross-sectional view in the case in which the vicinity of a winding core of an electrode body is cut by a plane vertical to an axial direction thereof in another example of the embodiment.
Figure 9:
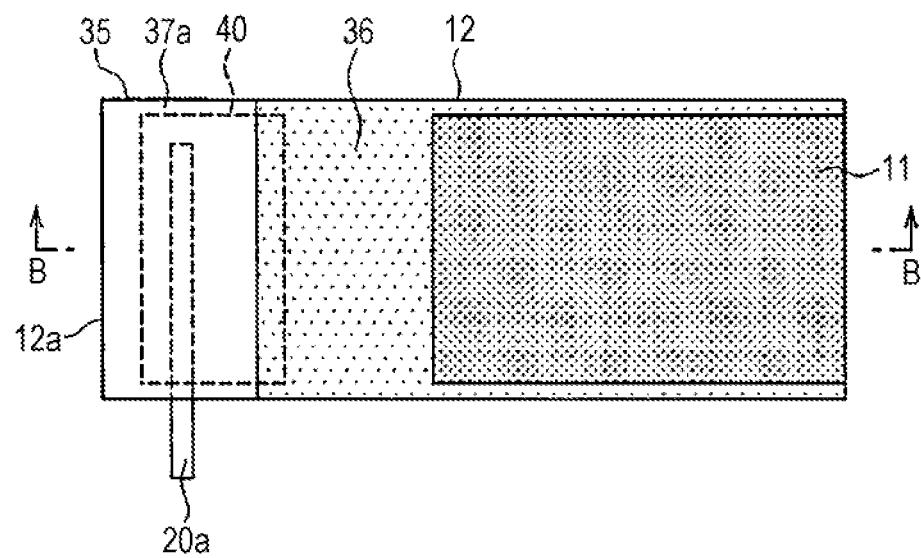
FIG. 9 is an enlarged view showing a developed state of a winding start side end of a negative electrode in the another example of the embodiment.
Figure 10:
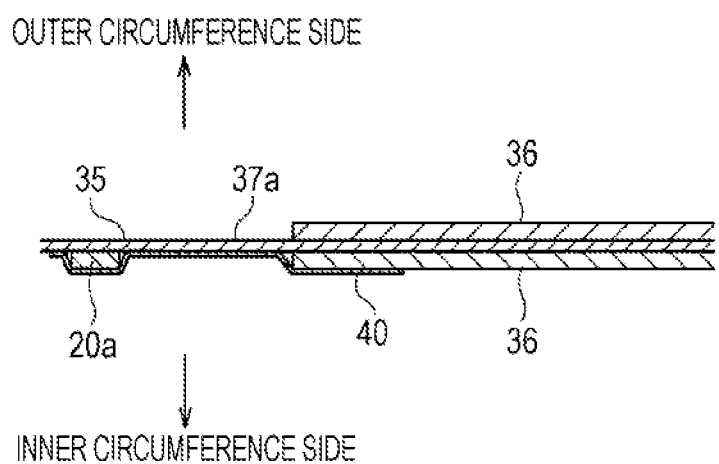
FIG. 10 is a B-B cross-sectional view of FIG. 9.

FIG. 8 is a cross-sectional view in the case in which the vicinity of a winding core of an electrode body is cut by a plane vertical to an axial direction thereof in another example of the embodiment. FIG. 9 is an enlarged view showing a developed state of a winding start side end of a negative electrode according to the another example of the embodiment. FIG. 10 is a B-B cross-sectional view of FIG. 9.

According to the structure of the another example shown in FIGS. 8 to 10, since the negative electrode lead 20a is provided on the un-covered portion 37a at an inner circumference side surface of the negative electrode collector, this structure is different from that of the embodiment described above. In the case described above, as is the case of the above embodiment, the insulating tape 40 is adhered to the negative electrode collector 35 so as to straddle the negative electrode lead 20a at the winding start side end in the winding direction.

EXAMPLES

After the present inventors of the present disclosure formed total six types of electrode bodies under the conditions shown in the following Table 1, the six types of electrode bodies including five types of Examples 1 to 5 and one type of Comparative Example shown in FIG. 11, charge/discharge cycle tests were performed under predetermined conditions, and in addition, the generation of the electrode plate deformation and the degree of the deformation thereof were confirmed.

mass of a silicon oxide was used. In addition, 100 parts by mass of the negative electrode active material, 1 part by mass of a styrene-butadiene rubber (SBR) as a binder, and 1 part by mass of a carboxymethyl cellulose (CMC) as a thickener were mixed together. Subsequently, the mixture thus prepared was dispersed in water, so that a negative electrode mixture slurry was prepared. This negative electrode mixture slurry was applied on two surfaces of a negative electrode collector formed of copper foil having a thickness of 8 μm to form negative electrode coating portions. Next, after coating films were dried in a heated drier, the coating films were rolled by a roller of a roll press machine so that the thickness of the electrode plate was 0.160 mm, thereby forming negative electrode active material layers. Subsequently, after the long negative electrode

TABLE 1

| | | LAYOUT OF NEGATIVE ELECTRODE | | | |
|---|---|---|---|---|---|
| | TAPE WIDTH/mm | OVERLAP OF TAPE WITH NEGATIVE ELECTRODE ACTIVE MATERIAL LAYER | TAPE ADHESION POSITION, WIDTH DIRECTION | TAPE LENGTH/mm | RESULT OF ELECTRODE PLATE DEFORMATION |
| EXAMPLE 1 | 60.0 | YES | CENTER | 12 | A |
| EXAMPLE 2 | 20.0 | YES | CENTER | 12 | A |
| EXAMPLE 3 | 60.0 | NO | CENTER | 6 | B |
| EXAMPLE 4 | 20.0 | YES | UPPER ⅓ POSITION OF BATTERY | 12 | B |
| EXAMPLE 5 | 20.0 | YES | LOWER ⅓ POSITION OF BATTERY | 12 | B |
| COMPARATIVE EXAMPLE | NO | NO | NO | NO | C |

Example 1

[Formation of Positive Electrode]

As a positive electrode active material, an aluminum-containing lithium nickel cobaltate represented by $LiNi_{0.88}Co_{0.09}Al_{0.03}O_2$ was used. First, 100 parts by mass of $LiNi_{0.88}Co_{0.09}Al_{0.03}O_2$, 1.0 part by mass of acetylene black, and 0.9 parts by mass of a poly(vinylidene fluoride) (PVDF) (binder) were mixed in N-methylpyrrolidone (NMP) used as a solvent, so that a positive electrode mixture slurry was prepared. Next, this positive electrode mixture slurry in the form of a paste was uniformly applied on two surfaces of a long positive electrode collector formed of aluminum foil having a thickness of 15 μm. Subsequently, on the positive electrode collector on which the coating films were formed, a heat treatment was performed in a heated drier at a temperature of 100° C. to 150° C. to remove NMP, and rolling was then performed using a roll press machine, so that positive electrode active material layers were formed. The positive electrode active material layers thus formed were brought into contact with a roller heated to 200° C. for 5 seconds, so that a heat treatment was performed. In addition, the long positive electrode collector on which the positive electrode active material layers were formed was cut into a predetermined electrode size, and a positive electrode lead formed of aluminum was then fitted thereto, so that a positive electrode was formed. In the positive electrode thus formed, the thickness thereof other than the positive electrode lead was 0.144 mm, the width was 62.6 mm, and the length was 861 mm.

[Formation of Negative Electrode]

As a negative electrode active material, a mixture containing 95 parts by mass of a graphite powder and 5 parts by collector on which the negative electrode active material layers were formed was cut into a predetermined electrode size, and a nickel-copper-nickel-made negative electrode lead was fitted thereto, a polypropylene-made insulating tape was adhered to the negative electrode collector so as to straddle the negative electrode lead in a winding direction, thereby forming a negative electrode. In this negative electrode, the insulating tape was adhered so as to be overlapped with the negative electrode active material layer by 2 mm. The width and the length of the insulating tape were 60.0 mm and 12 mm, respectively. The width and the length of the negative electrode thus formed were 64.2 mm and 959 mm, respectively.

[Preparation of Nonaqueous Electrolyte Solution]

To 100 parts by mass of a mixed solvent containing ethylene carbonate (EC) and dimethyl methyl carbonate (DMC) (volume ratio: EC:DMC=1:3), 5 parts by mass of vinylene carbonate (VC) was added. $LiPF_6$ was then dissolved in this mixed solvent to have a concentration of 1.5 mol/L, so that a nonaqueous electrolyte solution was prepared.

[Formation of Cylindrical Battery]

After the positive electrode and the negative electrode described above were formed, the positive electrode and the negative electrode were wound in a spiral shape with polyethylene-made separators interposed therebetween, so that an electrode body was formed. After insulating plates were disposed on the top and the bottom of the electrode body, the negative electrode lead and the positive electrode lead were welded to a bottom portion of a battery case and a sealing boy having an internal pressure sensitive safety valve, respectively, and the electrode body was received in a case main body of the battery case. Subsequently, after the nonaqueous electrolyte solution was charged in the case main body of the battery case by a reduced-pressure method, an opening portion of the case main body was sealed by caulking an opening end portion of the case main body to the sealing body with a gasket interposed therebetween, so that a cylindrical nonaqueous electrolyte secondary battery was formed. The capacity of this nonaqueous electrolyte secondary battery was 4,600 mAh.

Figure 11:
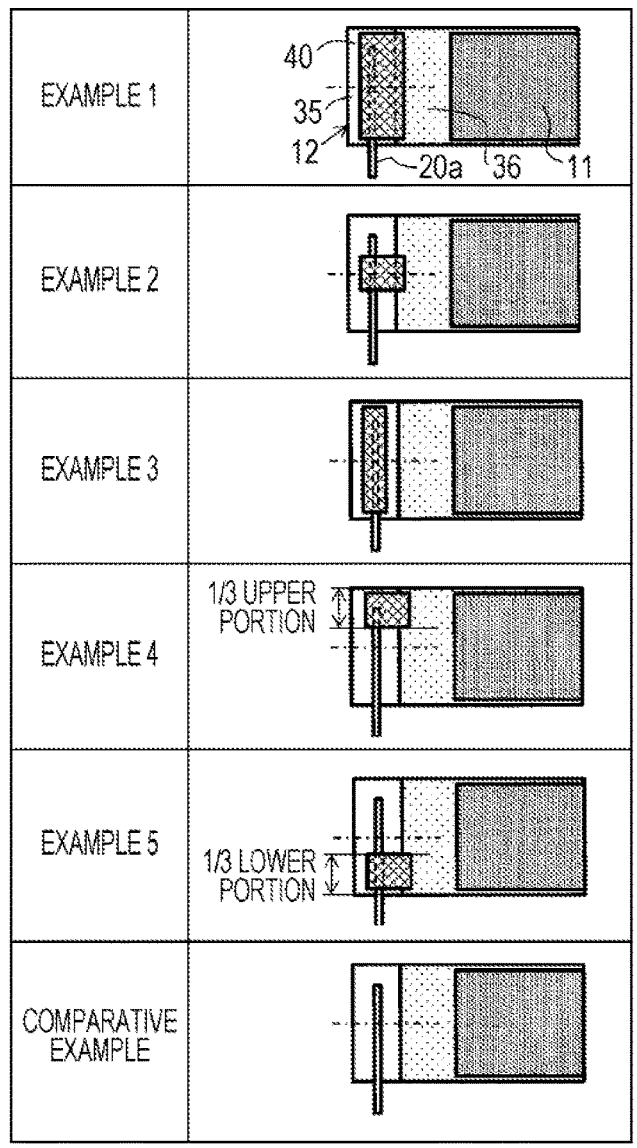
FIG. 11 is a view corresponding to FIG. 5 which shows the structure of each of Examples 1 to 5 and Comparative Example used in an experiment performed to confirm the effect of the embodiment.

In addition, in Example 1, as shown in Table 1 and FIG. 11, the width and the length of the insulating tape 40 were set to 60.0 mm and 12 mm, respectively, and the insulating tape 40 was partially overlapped with the negative electrode active material layer. In Table 1, "yes" in the column of "overlap of tape with negative electrode active material layer" indicates that the insulating tape 40 was partially overlapped with the negative electrode active material layer 36, and "no" indicates that the insulating tape 40 was not overlapped with the negative electrode active material layer 36. In addition, in Example 1, the insulating tape 40 covered the width-direction center of the negative electrode collector 35.

Example 2

In Example 2, as shown in Table 1 and FIG. 11, the width and the length of the insulating tape 40 were set to 20.0 mm and 12 mm, respectively, and the insulating tape 40 was partially overlapped with the negative electrode active material layer 36. In addition, in Example 2, the insulating tape 40 covered the wide-direction center of the negative electrode collector 35. In Example 2, the remaining structure was the same as that of Example 1.

Example 3

In Example 3, as shown in Table 1 and FIG. 11, the width and the length of the insulating tape 40 were set to 60.0 mm and 6 mm, respectively, and the insulating tape 40 was not overlapped with the negative electrode active material layer 36. In addition, in Example 3, the insulating tape 40 covered the wide-direction center of the negative electrode collector 35. In Example 3, the remaining structure was the same as that of Example 1.

Example 4

In Example 4, as shown in Table 1 and FIG. 11, the width and the length of the insulating tape 40 were set to 20.0 mm and 12 mm, respectively, and the insulating tape 40 was partially overlapped with the negative electrode active material layer 36. In addition, in Example 4, the insulating tape 40 covered an upper ⅓ area of the negative electrode collector 35 in the width direction, and the wide-direction center thereof was not covered. In Example 4, the remaining structure was the same as that of Example 1.

Example 5

In Example 5, as shown in Table 1 and FIG. 11, the width and the length of the insulating tape 40 were set to 20.0 mm and 12 mm, respectively, and the insulating tape 40 was partially overlapped with the negative electrode active material layer 36. In addition, in Example 5, the insulating tape 40 covered a lower ⅓ area of the negative electrode collector 35 in the width direction, and the wide-direction center thereof was not covered. In Example 5, the remaining structure was the same as that of Example 1.

Comparative Example

In Comparative Example, as shown in Table 1 and FIG. 11, no insulating tape 40 was adhered to a winding start side end of the negative electrode collector 35. In Comparative Example, the remaining structure was the same as that of Example 1.

[Test Method]

By the use of the above Examples 1 to 5 and Comparative Example, a constant current charge (CC) was performed at a charge current of 0.3 C (=1,380 mA) (0.3 hour rate) in an environment at 25° C., and a constant voltage charge (CV) was then performed at 4.2 V until the current reached a charge finish current of (1/50)C (=92 mA). Subsequently, after a rest was taken for 20 minutes, a constant current discharge was performed at a discharge current of IC (4,600 mA) (one hour rate), and a rest was then taken for 20 minutes. Such a charge/discharge cycle was repeatedly performed 500 cycles.

[Method to Confirm Electrode Plate Deformation]

By the use of the battery subjected to the charge/discharge cycle test described above, a constant current charge (CC) was performed at a charge current of 0.3 C (=1,380 mA) (0.3 hour rate), and a constant voltage charge (CV) was then performed at 4.2 V until the current reached a charge finish current of (1/50)C (=92 mA). Subsequently, by using an X-ray CT (Computed Tomography) apparatus, cross-sectional observation of the central portion of the electrode body 14 of the battery described above was performed, and the generation of the electrode plate deformation was confirmed, and when the electrode plate deformation was generated, the degree thereof was confirmed.

[Test Results]

Figure 12:
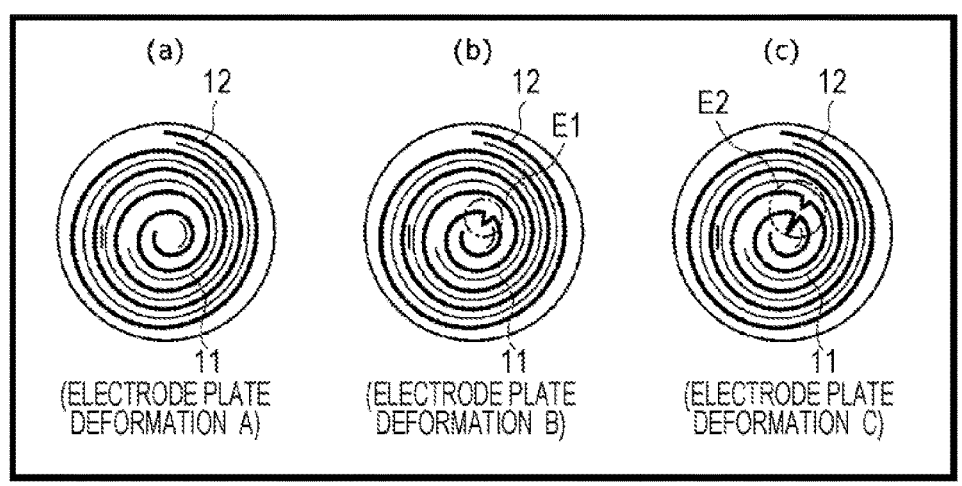
FIG. 12 is a view corresponding to FIG. 4 which shows examples of the results of electrode plate deformation each obtained in the experiment performed to confirm the effect of the embodiment.

The result of the cross-sectional observation of the electrode body 14 is shown by "A", "B", or "C" in the column of result of electrode plate deformation in Table 1. In this test, as shown in FIG. 12(a), "A" indicates the case in which the electrode plate deformation was not confirmed by the above cross-sectional observation. As shown by a portion of FIG. 12(b) surround by E1, "B" indicates the case in which although the electrode plate deformation was confirmed by the above cross-sectional observation, this deformation occurred only at the innermost circumference portion of the negative electrode 12. As shown by a portion of FIG. 12(c) surrounded by E2, "C" indicates the case in which the electrode plate deformation was confirmed by the above cross-sectional observation, and in addition, the deformation occurred not only at the innermost circumference portion of the negative electrode 12 but also at the other portion thereof.

As shown in Table 1, in Examples 1 and 2, the electrode plate deformation was not confirmed. In addition, in Examples 3 to 5, although the electrode plate deformation was confirmed, the degree thereof was not serious. On the other hand, in Comparative Example, the electrode plate deformation was confirmed, and furthermore, the deformation occurred not only at the innermost circumference portion of the negative electrode 12 but also at the other portion thereof. Accordingly, in the embodiment in which the insulating tape 40 was adhered to the winding start side end of the negative electrode collector 35, it was confirmed that the electrode plate deformation could be suppressed. In addition, in the embodiment in which the insulating tape 40 was adhered to the wide-direction center of the negative electrode collector 35, it was confirmed that the electrode plate deformation could be further suppressed.

In addition, regardless of any of the positive electrode material, the negative electrode material, and the separator material, it is believed that as long as a winding type electrode body which includes a negative electrode lead at a winding start side end is formed, an effect similar to the effect obtained in the embodiment and the examples described above can be expected.

REFERENCE SIGNS LIST

10 nonaqueous electrolyte secondary battery, 11 positive electrode, 12 negative electrode, 12*a* winding-direction inner end, 13 separator, 14 electrode body, 15 case main body, 16 sealing body, 17 and 18 insulating plate, 19 positive electrode lead, 20*a* and 20*b* negative electrode lead, 21 protruding portion, 22 filter, 23 lower valve, 24 insulating member, 25 upper valve, 26 cap, 27 gasket, 28 space, 29 winding central axis, 30 positive electrode collector, 31 positive electrode active material layer, 32, 37*a*, and 37*b* un-covered portion, 35 negative electrode collector, 36 negative electrode active material layer, 40 insulating tape.

The invention claimed is:

1. A nonaqueous electrolyte secondary battery comprising:
    a winding type electrode body in which a positive electrode and a negative electrode including a negative electrode active material layer formed on a surface of a belt-shaped negative electrode collector are wound in a spiral shape with at least one separator interposed therebetween,
    wherein the negative electrode
    includes a negative electrode lead bonded to a winding start side end of the negative electrode collector,
    is wound at least one turn from a winding-direction inner end such that neither of inner side and outer side of the negative electrode in a radial direction faces, within the at least one turn from the winding-direction inner end, the positive electrode with the separator interposed therebetween, and
    includes an insulating tape adhered to the negative electrode collector so as to straddle a surface of the negative electrode lead in the winding direction,
    wherein the insulating tape is partially overlapped with the negative electrode active material layer, and covers a portion including a width-direction center of the negative electrode collector, said portion located between the electrode active material layer and the negative electrode lead, and
    wherein the negative electrode includes an un-covered portion in the winding start side end of the negative electrode collector, wherein a surface of the negative electrode collector is exposed at the un-covered portion.

2. The nonaqueous electrolyte secondary battery according to claim 1,
    wherein the insulating tape is a two-layer tape formed of a base material layer and an adhesive layer.

3. The nonaqueous electrolyte secondary battery according to claim 2,
    wherein a primary component of the base material layer is a polypropylene.

4. The nonaqueous electrolyte secondary battery according to claim 1,
    wherein the thickness of the insulating tape is smaller than the thickness of the negative electrode lead.

5. The nonaqueous electrolyte secondary battery according to claim 1,
    wherein in the electrode body, a space is formed at a winding core portion, and
    the negative electrode lead is bonded to an outer circumference side surface of the negative electrode collector.

6. The nonaqueous electrolyte secondary battery according to claim 1,
    wherein the negative electrode lead faces the negative electrode via the separator therebetween.

* * * * *